US007913408B2

(12) United States Patent
Grisham

(10) Patent No.: US 7,913,408 B2
(45) Date of Patent: Mar. 29, 2011

(54) CHALK LINE DEVICE, HOOK THEREFOR, AND METHOD

(75) Inventor: Matthew Grisham, Hartford, CT (US)

(73) Assignee: Stanley Black & Decker, Inc., New Britain, CT (US)

( * ) Notice: Subject to any disclaimer, the term of this patent is extended or adjusted under 35 U.S.C. 154(b) by 228 days.

(21) Appl. No.: 12/116,023

(22) Filed: May 6, 2008

(65) Prior Publication Data

US 2009/0277027 A1 Nov. 12, 2009

(51) Int. Cl.
*F16B 45/00* (2006.01)
*B44D 3/38* (2006.01)

(52) U.S. Cl. .......................................... 33/414; 33/1 LE

(58) Field of Classification Search ............ 33/407–409, 33/413, 414, 1 LE, 755, 756, 758, 768, 770
See application file for complete search history.

(56) References Cited

U.S. PATENT DOCUMENTS

| | | | | |
|---|---|---|---|---|
| 375,205 | A | | 12/1887 | Sheldon |
| 554,127 | A | | 2/1896 | Jablonsky |
| D92,798 | S | | 7/1934 | Furtsch |
| 2,406,895 | A | | 9/1946 | Olson |
| 2,663,938 | A | * | 12/1953 | Stodgell .......................... 33/413 |
| 2,820,533 | A | | 1/1958 | Mount |
| 3,126,637 | A | * | 3/1964 | Short .............................. 33/414 |
| 3,200,500 | A | * | 8/1965 | Stone .............................. 33/409 |
| 3,408,742 | A | * | 11/1968 | Caprio et al. ................... 33/409 |
| 4,565,011 | A | * | 1/1986 | Karger ............................ 33/414 |
| 4,858,286 | A | | 8/1989 | Siegel |
| 4,995,152 | A | * | 2/1991 | Steckler ...................... 24/129 R |
| 5,357,656 | A | | 10/1994 | Trowbridge |
| 5,479,713 | A | * | 1/1996 | Wood .............................. 33/407 |
| 5,509,616 | A | * | 4/1996 | Millen et al. ............... 242/381.5 |
| 5,515,582 | A | | 5/1996 | Trowbridge |
| 5,791,810 | A | | 8/1998 | Williams |
| 5,937,532 | A | * | 8/1999 | Eirich et al. .................... 33/758 |
| 6,470,581 | B1 | | 10/2002 | Kolodzieski |
| 6,547,478 | B1 | | 4/2003 | Lin |
| 6,745,485 | B2 | | 6/2004 | Shor |
| 7,415,778 | B1 | * | 8/2008 | McEwan et al. ................ 33/761 |
| 2005/0050695 | A1 | | 3/2005 | Mackey et al. |
| 2007/0068021 | A1 | | 3/2007 | Fisher |

* cited by examiner

*Primary Examiner* — Yaritza Guadalupe-McCall
(74) *Attorney, Agent, or Firm* — Pillsbury Winthrop Shaw Pittman LLP

(57) ABSTRACT

A chalk line hook is constructed and arranged to connect with an identical chalk line hook to provide a chalk line having a length of two chalk lines. The chalk line hook includes a connector portion, an anchor portion, and a lock portion. The connector portion is constructed and arranged to connect with a free end of the chalk line. The anchor portion is operatively joined with the connector portion for anchoring the hook. The lock portion is constructed and arranged to lockingly engage with a captured portion of the identical chalk line hook.

11 Claims, 13 Drawing Sheets

CHALK LINE DEVICE, HOOK THEREFOR, AND METHOD

BACKGROUND OF THE INVENTION

Field of the Invention

The present invention relates to chalk line devices and to chalk line hooks.

Chalk line devices are widely employed, in building construction and carpentry projects, to mark straight lines along a work piece or work place. Generally, the chalk line device includes a housing or casing, which defines a reservoir for storing chalk and stores an extendable line about a spool that is driven by a crank outside of the housing. The chalk line devices use a finely powdered chalk which is applied to the chalk line within the housing. The powdered chalk is usually colored brightly so as to allow the user to distinguish a mark line from a surface color of the work piece. The chalk line typically terminates in a clip or a hook. The clip or hook facilitates securing the chalk line to a work piece, and may also act as a stop against a wall of the housing to prevent the end of the chalk line from entering inside the housing during rewinding of the chalk line. The present invention provides improvements over the prior art chalk line devices, hooks, and methods.

SUMMARY OF THE INVENTION

One aspect of the invention relates to a chalk line hook. The chalk line hook is constructed and arranged to connect with an identical chalk line hook to provide a chalk line having a length of two chalk lines. The chalk line hook comprises a connector portion, an anchor portion, and a lock portion. The connector portion is constructed and arranged to connect with a free end of the chalk line. The anchor portion is operatively joined with the connector portion for anchoring the hook. The lock portion is constructed and arranged to lockingly engage with a captured portion of the identical chalk line hook.

Another aspect of the invention related to a chalk line device. The chalk line device comprises a housing, a chalk line support, a chalk line, and a chalk line hook. The housing comprises a reservoir for storing chalk and the chalk line support is placed within the housing. The chalk line is constructed and arranged to be secured to the chalk line support at one end. The chalk line hook is connected to the chalk line at a free end of the line. The chalk line hook is constructed and arranged to connect with an identical chalk line hook to provide a chalk line having a length of two chalk lines. The hook comprises a connector portion, an anchor portion, and a lock portion. The connector portion is constructed and arranged to connect with the free end of the chalk line. The anchor portion is operatively joined with the connector portion for anchoring the hook. The lock portion is constructed and arranged to lockingly engage with a captured portion of the identical chalk line hook.

Another aspect of the invention relates to a chalk line hook. The chalk line hook comprises a connector portion, an anchor portion, and a neck portion. The connector portion is constructed and arranged to connect with a free end of a chalk line. The anchor portion comprises a pair of spaced prongs. The neck portion is shaped and dimensioned to fit between and be retained between spaced prongs of an identically configured chalk line hook.

These and other aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
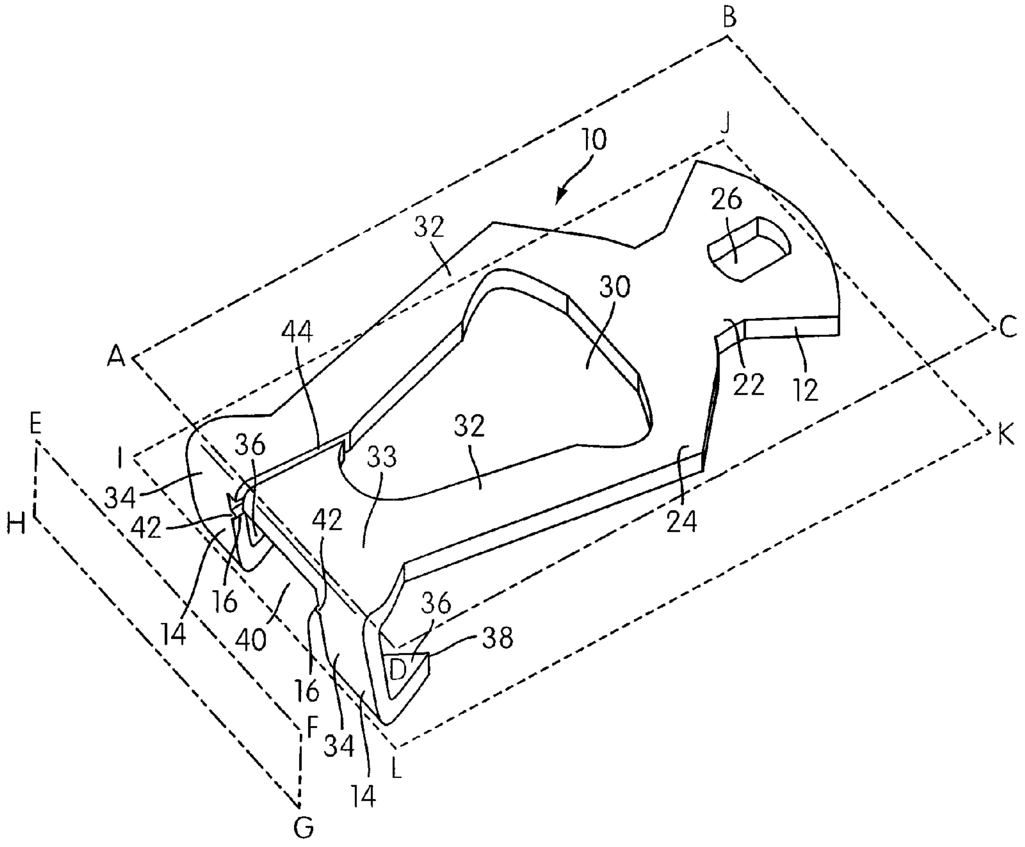
FIG. 1 is a perspective view of a chalk line hook in accordance with an embodiment of the present invention.
Figure 2:
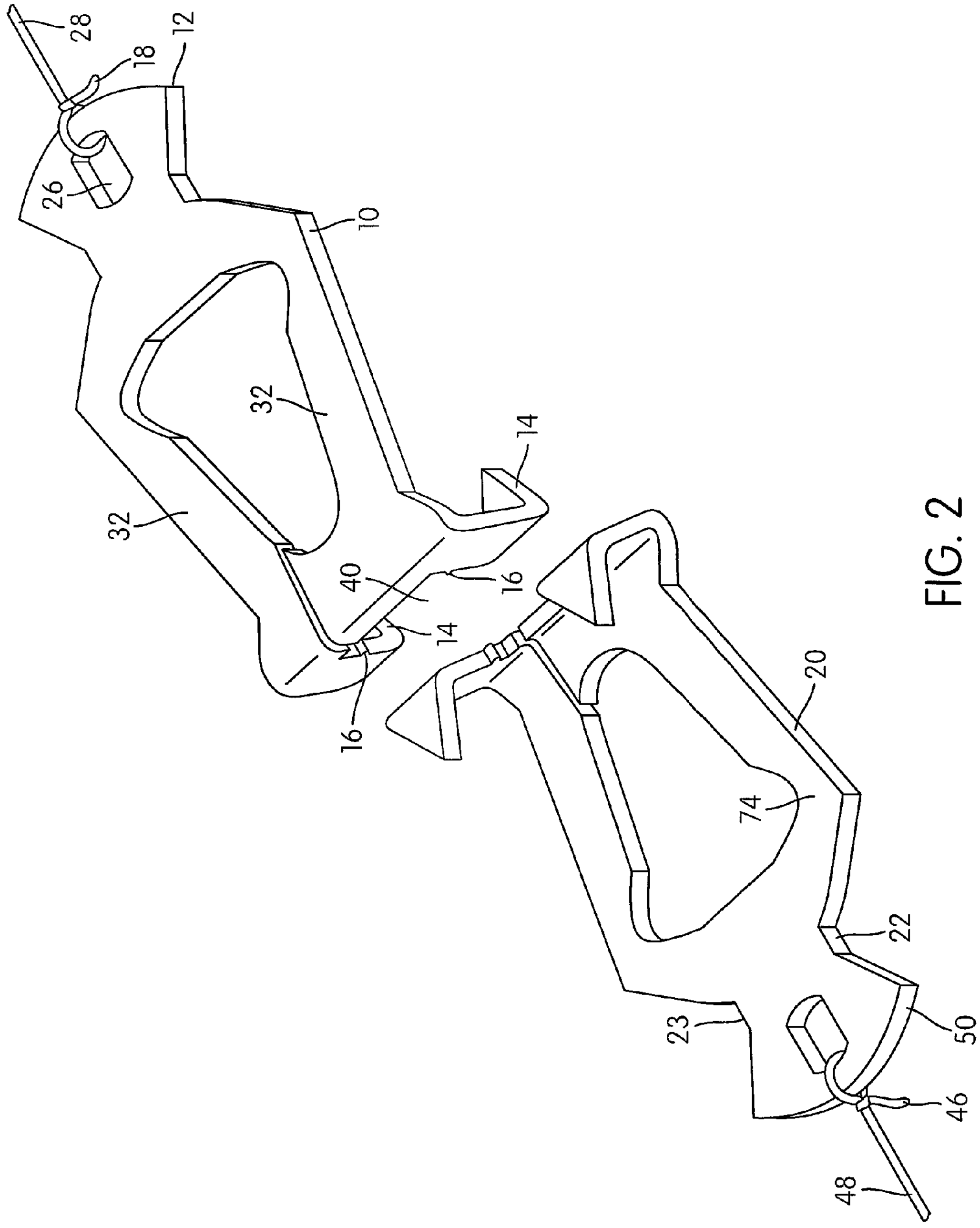
FIG. 2 is a perspective view of two identical chalk line hooks, each connected to a chalk line in accordance with an embodiment of the present invention.
Figure 7:
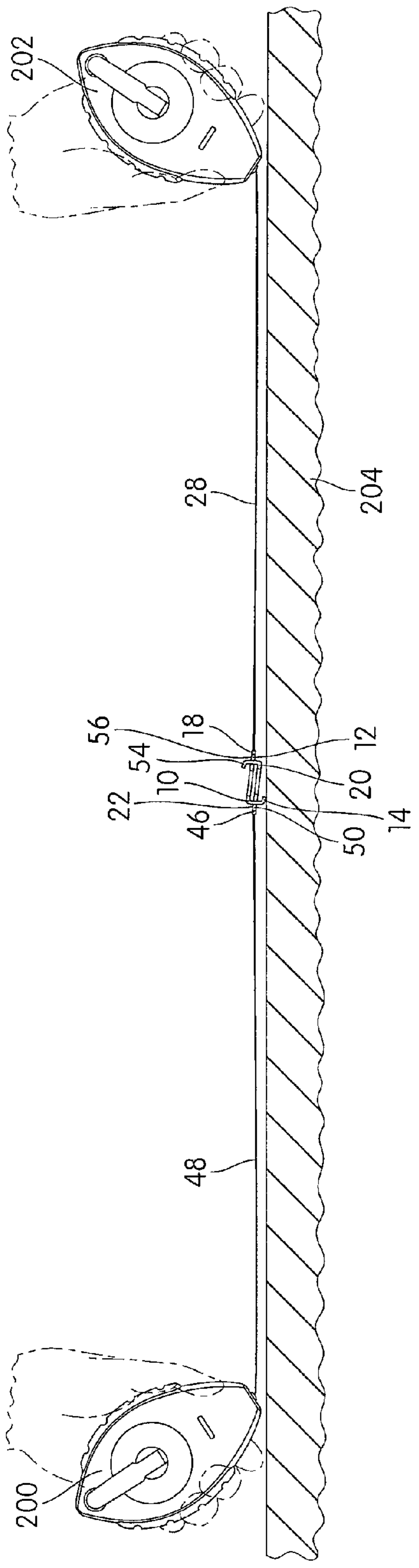
FIG. 7 is a perspective view of the two chalk line devices connected to each other using two identical chalk line hooks in accordance with an embodiment of the present invention.

FIG. 1 shows a chalk line hook 10 that is constructed and arranged to connect with an identical chalk line hook 20 (as shown in FIG. 2) to provide a chalk line having a length of the chalk lines of two chalk line devices (e.g., See FIG. 7). Also, when the chalk line hook 10 and the identical chalk line hook 20 are connected together, the hooks provide a chalk line of only a single line length that can be rechalked easily without the need for a user to walk to the chalk line hook 10 to disconnect the hooks so that the chalk line can be wound into the reel to receive chalk. In other words, when two users are operating the two connected chalk line devices, they may choose to keep one of the lines fully or mostly retracted, and the other line fully or partially extended. In this manner, when the extended line is depleted of chalk, it can then be retracted as the retracted line is extended for use. This method of operation can be sequentially repeated. This method of use allows faster operation, since it enables one line to be re-chalked while the other is being used. There is no need to conduct both a retract and then re-extend a single line each time there is a desire to rechalk a line; only a single operation is required. The chalk line hook 10 includes a connector portion 12, an anchor portion 14, and a lock portion 16. The connector portion 12 is constructed and arranged to connect with a free end 18 of a chalk line 28 (as shown in FIG. 2) as will be appreciated from the discussions later. The anchor portion 14 is operatively joined with the connector portion 12 for anchoring the hook 10 to a work piece. The lock portion 16 is constructed and arranged to lockingly engage with a captured portion 22 of the identical chalk line hook 20.

In one embodiment, the chalk line hook 10 has a base portion 24 with the connector portion 12 on one end thereof and the anchor portion 14 extending outwardly from the other end thereof. The base portion 24 defines a base plane as shown by ABCD.

The connector portion 12 includes a dovetail shaped portion with an opening 26 located centrally therethrough. In the illustrated embodiment, the opening 26 includes an oblong shaped opening. In the illustrated embodiment, as shown in FIG. 2, the chalk line 28 is tied around the opening 26 to connect the chalk line 28 with the chalk line hook 10. In this method of assembly, the free end 18 is passed through the opening 26 provided in the connector portion 12. The free end 18 can then be spliced or connected back onto itself for connecting the chalk line 28 with the chalk line hook 10 as shown in FIG. 2. In other embodiments, however, the opening 26 may have any shape or configuration as long as the opening 26 aids in connecting the free end 18 of a chalk line 28 (as shown in FIG. 2) to the chalk line hook 10. In one embodiment, the chalk line 28 may be looped on itself to connect the free end 18 of the chalk line 28 to the chalk line hook 10. In this embodiment, the connector portion 12 may not include the opening 26, but instead may include a wedge or other similar attachment shape for holding a looped chalk line device in place. In other embodiment, the connector portion 12 may have tabs to connect the free end 18 of a chalk line 28 to the chalk line hook 10.

The anchor portion 14 includes a pair of prongs 32 that are spaced apart from each other. Towards the base portion 24, the space is a rather large opening 30. Each prong 32 is integrally formed (e.g., stamped from metal) with the base portion 24. In other embodiment, each prong 32 includes a first portion 33 extending from base portion 24, generally in the same plane as base portion 24, a second portion 34 that extends perpendicularly to the first portion 33, and a third portion 36 that extends perpendicularly to the second portion 34 and in spaced, parallel relation to the first portion 33. The third portion 36 is constructed and arranged to anchor the chalk line hook 10 to a work piece. In other embodiment, the chalk line hook 10 may include only one prong instead of the pair of prongs.

The second portion 34 extends generally in a first plane EFGH that makes a first angle with the base plane ABCD of the base portion 24. As noted above, in one embodiment, the first plane EFGH is substantially perpendicular to the base plane ABCD. The third portion 36 extends at a second angle from the first plane EFGH of the second portion 34. As noted above, in one embodiment, the third portion 36 generally lies in a second plane IJKL substantially parallel to the base plane ABCD of the base portion 24 and the first portion 33. In the illustrated embodiment, the third portion 36 includes an end 38, which is opposite to the second portion 34, constructed and arranged to anchor the chalk line hook 10 along with the chalk line to a work piece. In the illustrated embodiment, the third portion 36 includes a triangular shaped portion to form the pointed end 38. It should be appreciated however that the third portion 36 may have any shape or configuration to enable the third portion 36 to anchor the chalk line to a work piece. In one embodiment, the third portion 36 may include a sharp edge, instead of a pointed end, to pierce the chalk line hook into the work piece. Alternatively, a blunt configuration can be used to simply allow the hook to form fittingly engage a work piece.

A slot 44 is defined in a narrowed slot region or space 40 located between the pair of prongs 32. The slot 44 is constructed and arranged to spread to accommodate the captured portion 22 of the identical chalk line hook 20 (as shown in FIG. 2) so as to connect the two chalk line hooks. In other embodiment, the prongs 32 may not define the narrowed slot 44, but may remain widely spaced throughout.

In the illustrated embodiment, the lock portion 16 includes a pair of bumps 42 that receive the captured portion 22 of the identical chalk line hook 20 therebetween. Each bump 42 is provided on each prong 32 respectively. The prongs 32 are slightly flexible apart to enable separation therebetween to enable the captured portion 22 of the identical chalk line hook 20 (as shown in FIG. 2) to ride over the bumps 42, and then enable the bumps 42 to return to their original positions to secure the captured portion 22 therebehind. It should be appreciated, however, that this embodiment is one but an example of the different types of shapes, configurations and/or constructions that can be provided for the lock portion 16. In one embodiment, bumps are provided on the captured portion 22 of the identical chalk line hook 20 that are constructed and arranged to engage with recesses provided on prongs 32 of the chalk line hook 10.

FIG. 2 shows two identical chalk line hooks. As explained in the discussions above, the free end 18 of the chalk line 28 is connected to the connector portion 12 of the chalk line hook 10. Similarly, a free end 46 of a chalk line 48 is connected to a connector portion 50 of the identical chalk line hook 20. In one embodiment, the captured portion 22 of the identical chalk line hook 20 includes a narrow diameter portion 23 located between the connector portion 50 and a base portion 74. The captured portion 22 of the identical chalk line hook 20 is constructed and arranged to fit in the space 40 between a pair of the prongs 32 of the chalk line hook 10.

Figure 3:
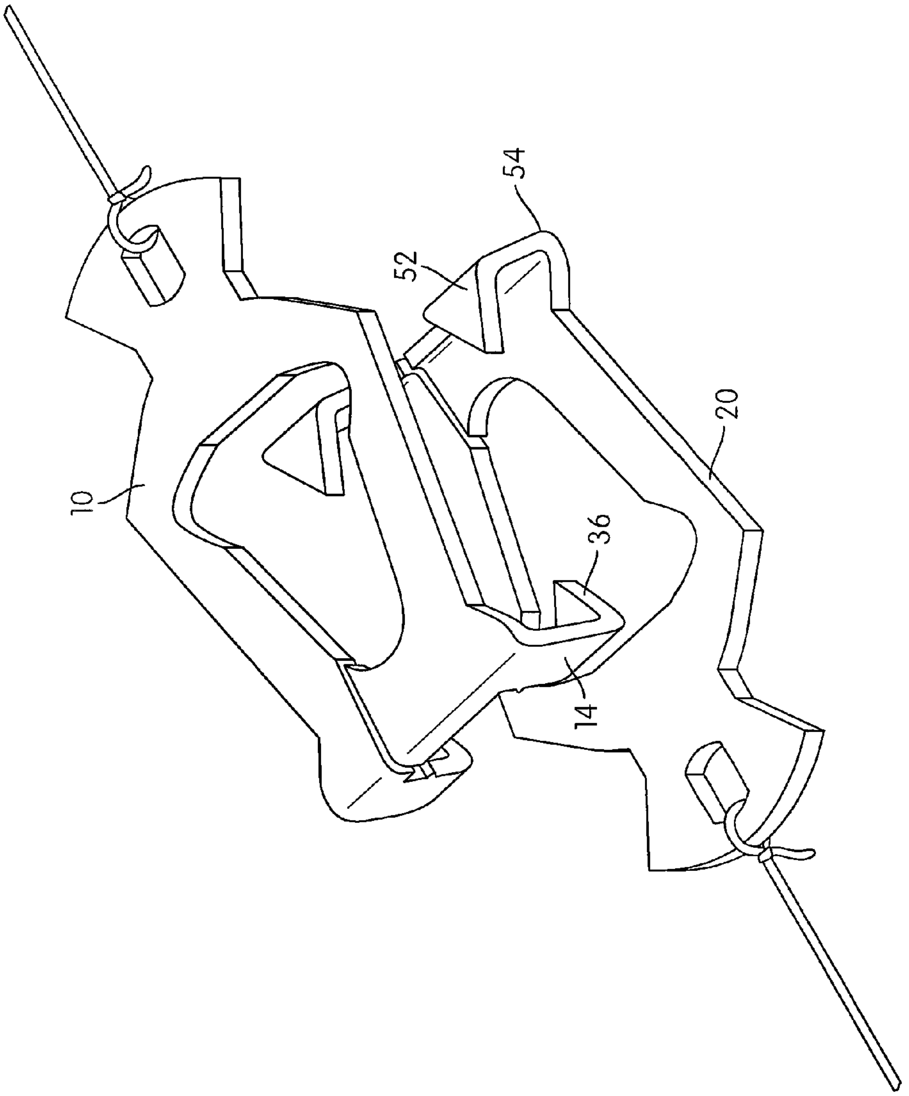
FIG. 3 is a perspective view of two identical chalk line hooks brought into close proximity of each other in accordance with an embodiment of the present invention.

As shown in FIG. 3, the identical chalk line hook 20 is placed such that third portion 52 of anchor portion 54 of the identical chalk line hook 20 is facing the third portion 36 of the anchor portion 14 of the chalk line hook 10 when the two identical chalk line hooks are being connected with each other.

Figure 4:
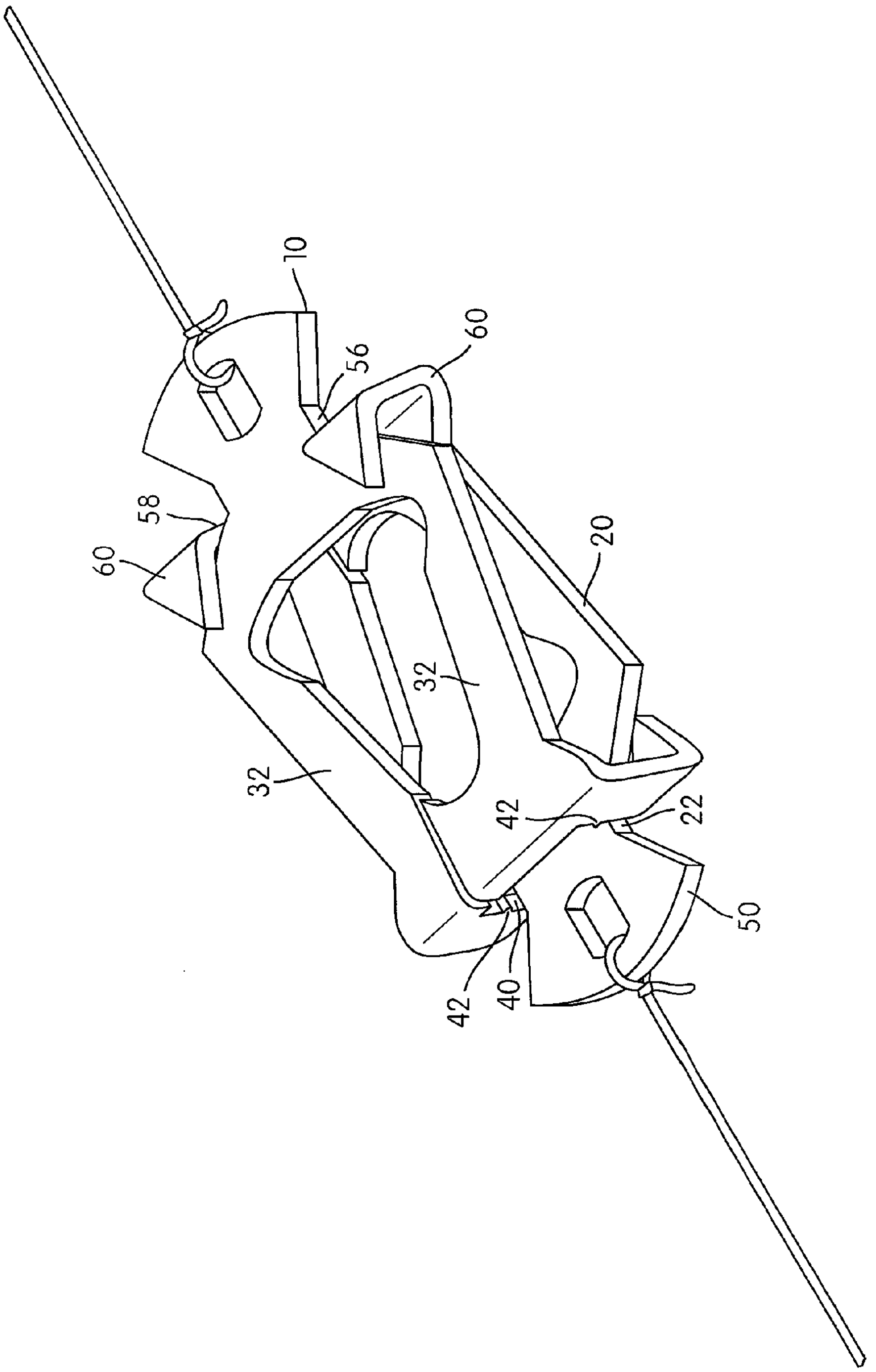
FIG. 4 is a perspective view of the two identical chalk line hooks being engaged with each other but before being locked together in accordance with an embodiment of the present invention.
Figure 4A:
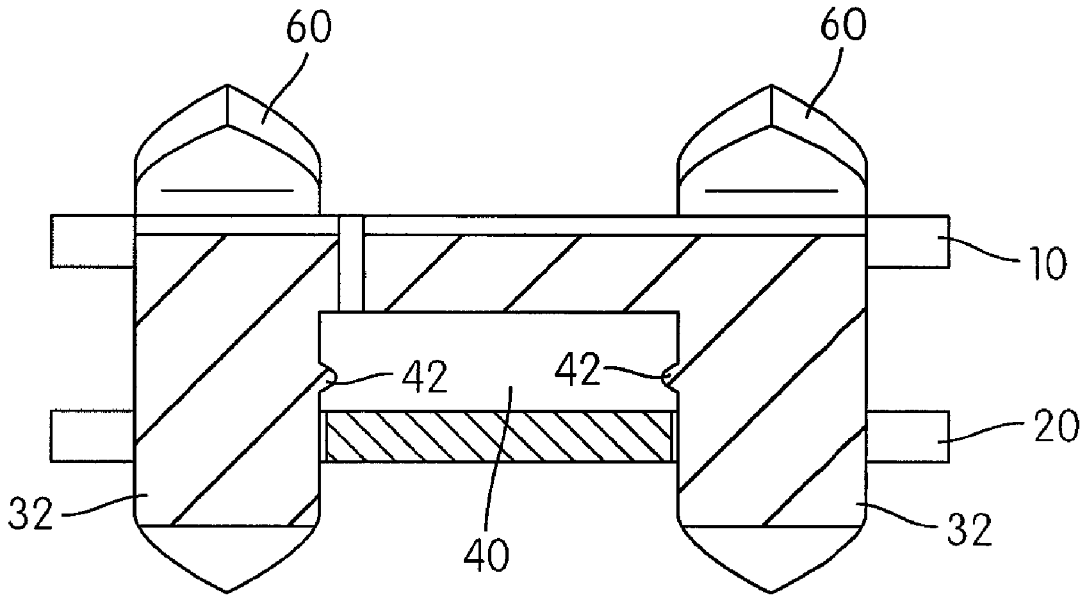
FIG. 4*a* is a front view of the two identical chalk line hooks being engaged with each other but before being locked together in accordance with an embodiment of the present invention.

FIGS. 4 and 4*a* show the two identical chalk line hooks being engaged with each other but before being locked in place. As explained in the discussions earlier, when connecting the two identical chalk line hooks together, the captured portion 22 of the identical chalk line hook 20 is accommodated in the space 40 located between the second portions of the pair of prongs 32. Similarly, captured portion 56 of the chalk line hook 10 is accommodated in space 58 located between the second portions of a pair of prongs 60 of the identical chalk line hook 20.

When connecting the chalk lines hooks 10 and 20 with each other, as shown in FIGS. 4 and 4*a*, the captured portion 22 of the identical chalk line hook 20 moves into the space 40 located between the pair of prongs 32 until further movement of the captured portion 22 is prevented by the bumps 42 provided on prongs 32. At this point, a force is applied on the connector portion 50 causing the prongs 32 to flex outwards, thus, enabling the captured portion 22 to ride over the bumps 42.

Figure 5:
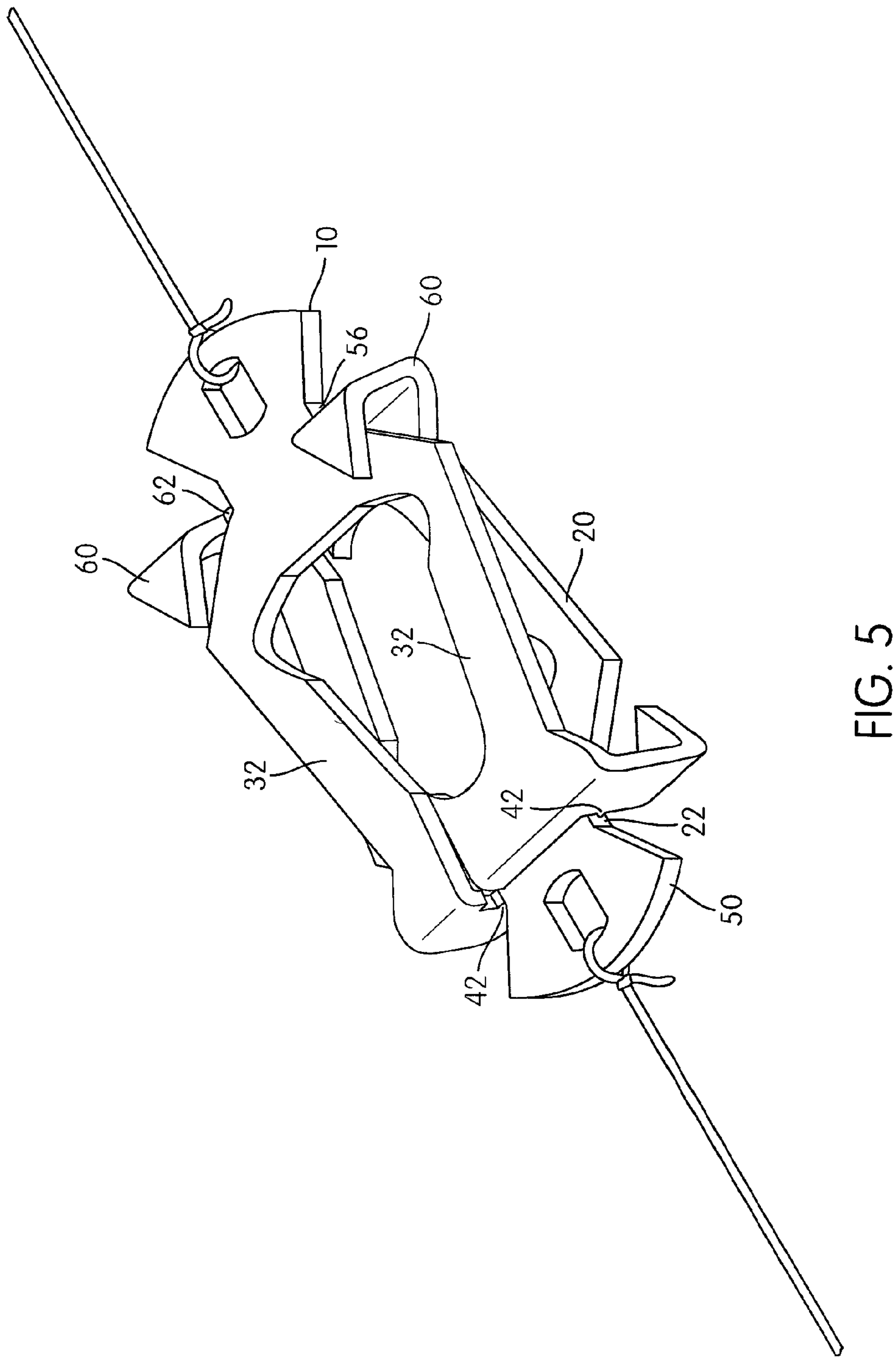
FIG. 5 is a perspective view of the two identical chalk line hooks being engaged with each other, wherein the captured portion of the identical chalk line hook rides over the bumps on the chalk line hook in accordance with an embodiment of the present invention.
Figure 5A:
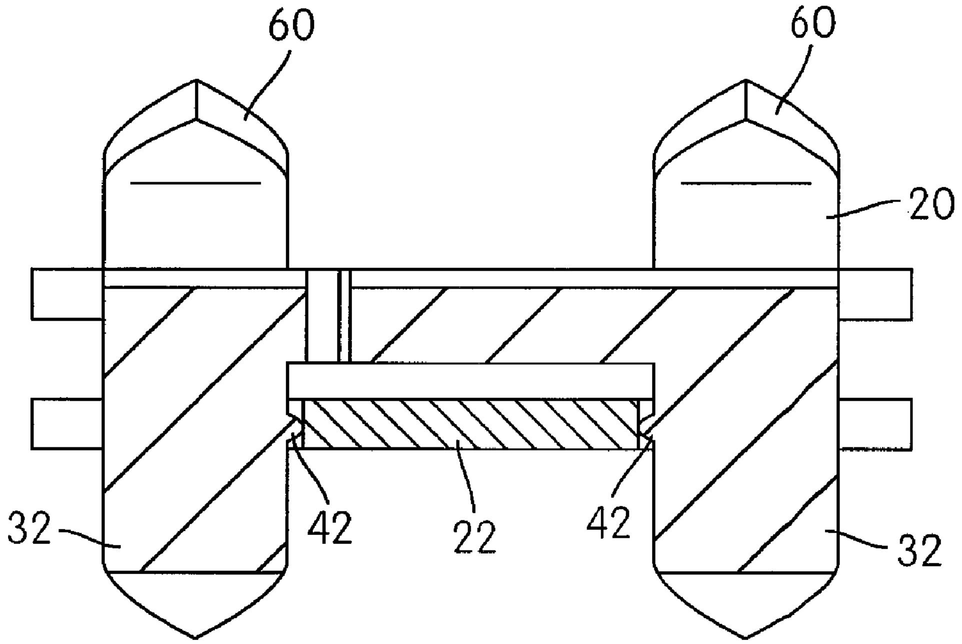
FIG. 5*a* is a front view of the two identical chalk line hooks being engaged with each other, wherein the captured portion of the identical chalk line hook rides over the bumps on the chalk line hook in accordance with an embodiment of the present invention.

FIGS. 5 and 5*a* show a step in connecting the two identical chalk line hooks with each other where the captured portion 22 is riding over the bumps 42 and the prongs 32 are in a flexed position. The flexible prongs 32 enable separation therebetween to enable the captured portion 22 of the identical chalk line hook 20 ride over the pair of bumps 42 of the anchor portion 14 of the chalk line hook 10. Similarly, the flexible prongs 60 of the identical chalk line hook 20 enable separation therebetween to enable captured portion 56 of the chalk line hook 10 ride over a pair of bumps 62 (as shown in FIG. 6).

Figure 6:
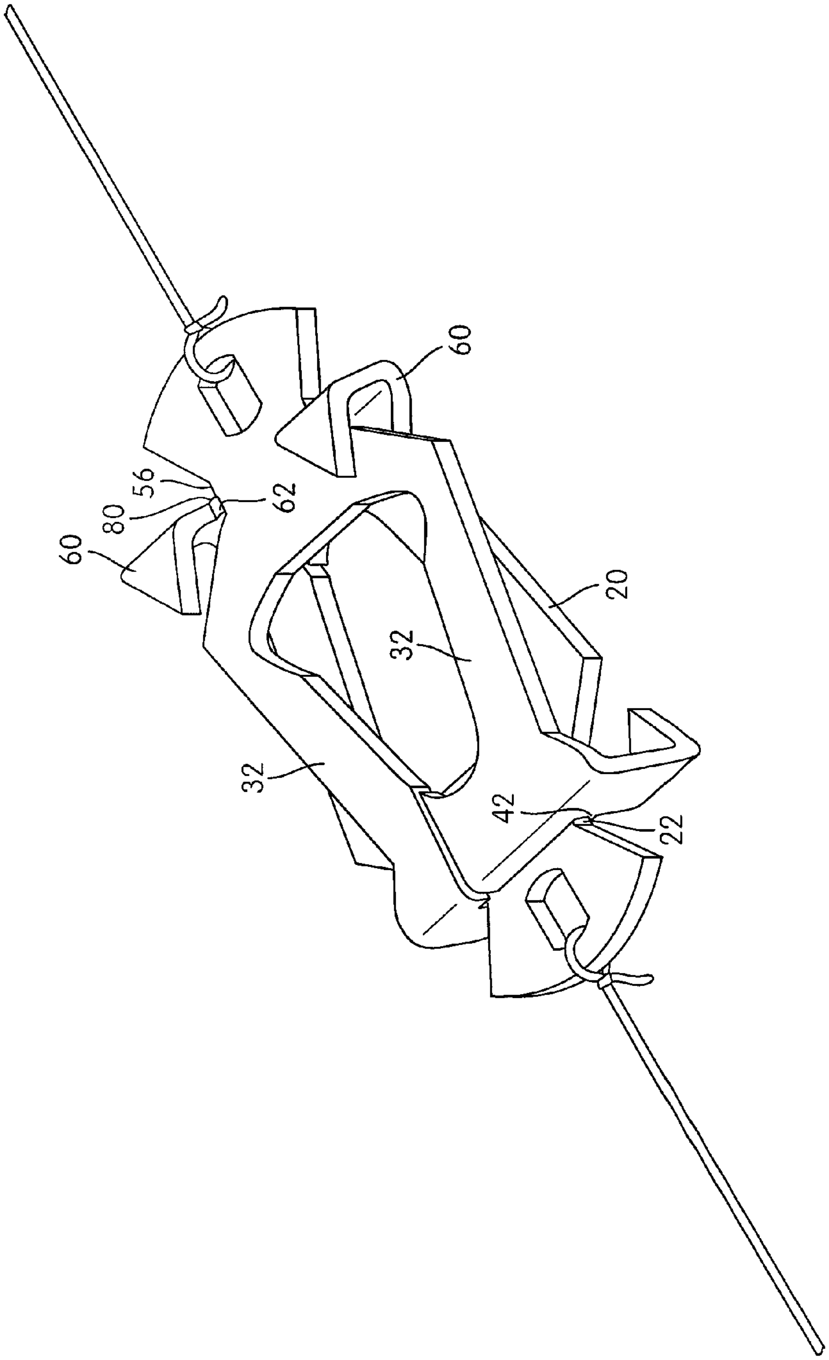
FIG. 6 is a perspective view of the two identical chalk line hooks locked with each other in accordance with an embodiment of the present invention.
Figure 6A:
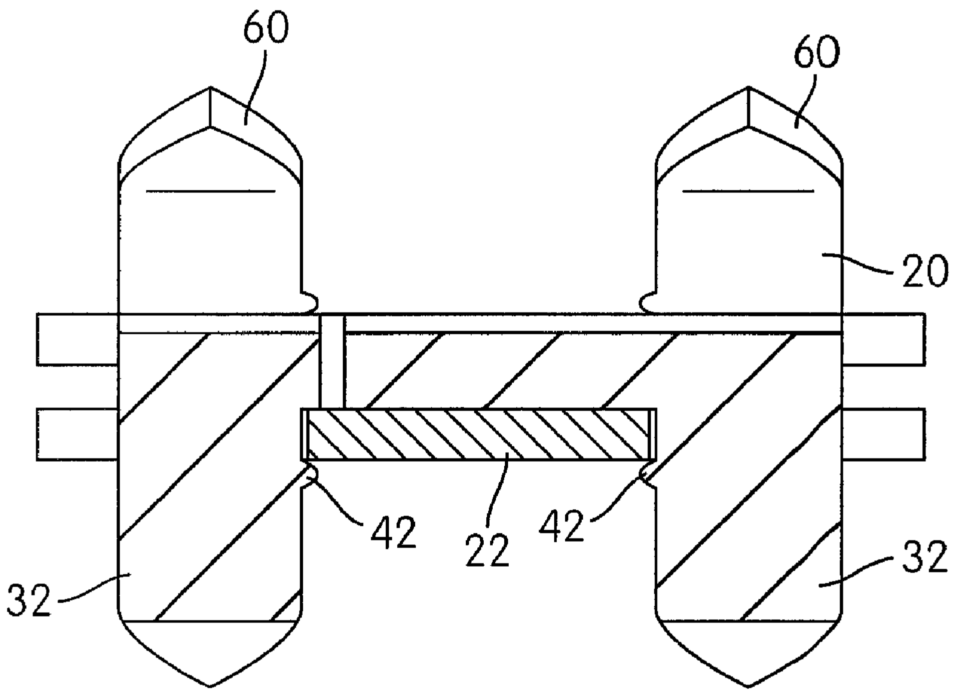
FIG. 6*a* is a front view of the two identical chalk line hooks locked with each other in accordance with an embodiment of the present invention.

FIGS. 6 and 6*a* show the two identical chalk line hooks being locked with each other. The flexible prongs 32 return back to their original position after the captured portion 22 of the identical chalk line hook 20 rides over the pair of the bumps 42, thus securing the captured portion 22 behind the bumps 42. Similarly, the flexible prongs 60 of the identical chalk line hook 20 return back to their original position after the captured portion 56 of the identical chalk line hook 10 rides over the pair of the bumps 62, thus securing the captured portion 56 behind the bumps 62.

FIG. 7 shows two chalk line devices connected to each other using two identical chalk line hooks. The shape and configuration of the chalk line hooks, as described in the present invention, allows the chalk line hooks to be locked with each other thus providing a chalk line having a length of two chalk lines from two chalk line devices. In detail, the free end 46 of the chalk line 48 from the chalk line device 200 is connected to connector portion 50 of the chalk line hook 20 and the free end 18 of the chalk line 28 from the chalk line device 202 is connected to the connector portion 12 of the chalk line hook 10. As explained in the previous embodiments, the anchor portion 14 of the chalk line hook 10 engages with the captured portion 22 of the chalk line hook 20 and the anchor portion 54 of the chalk line hook 20 engages with the captured portion 56 of the chalk line hook 10 to lock the two identical chalk line hooks together.

Figure 8:
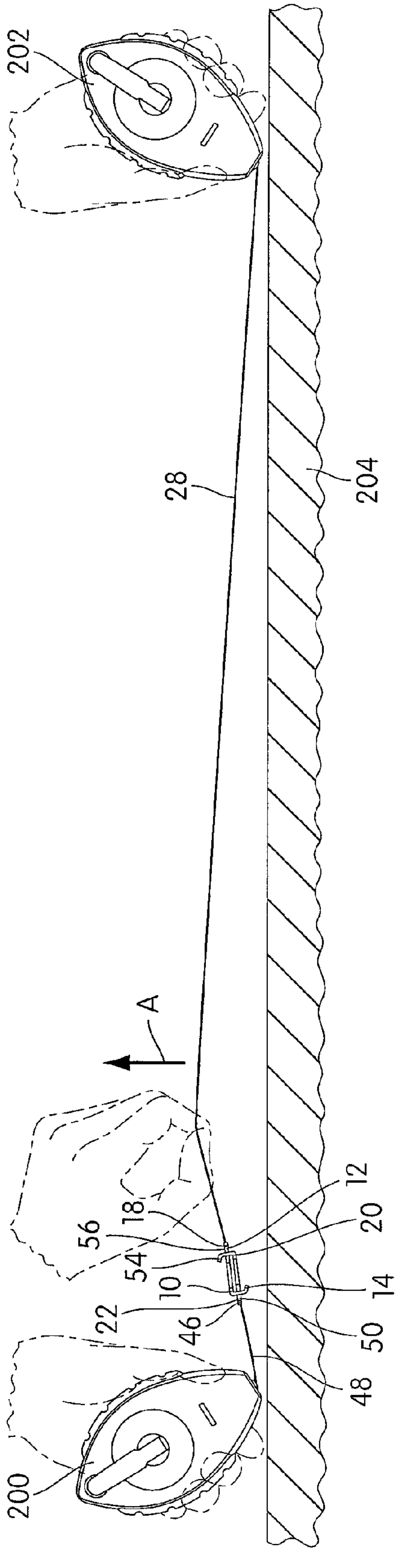
FIG. 8 is a perspective view of the chalk line being stretched from a chalk line device, which is connected with another chalk line device using two identical chalk line hooks in accordance with an embodiment of the present invention.
Figure 9:
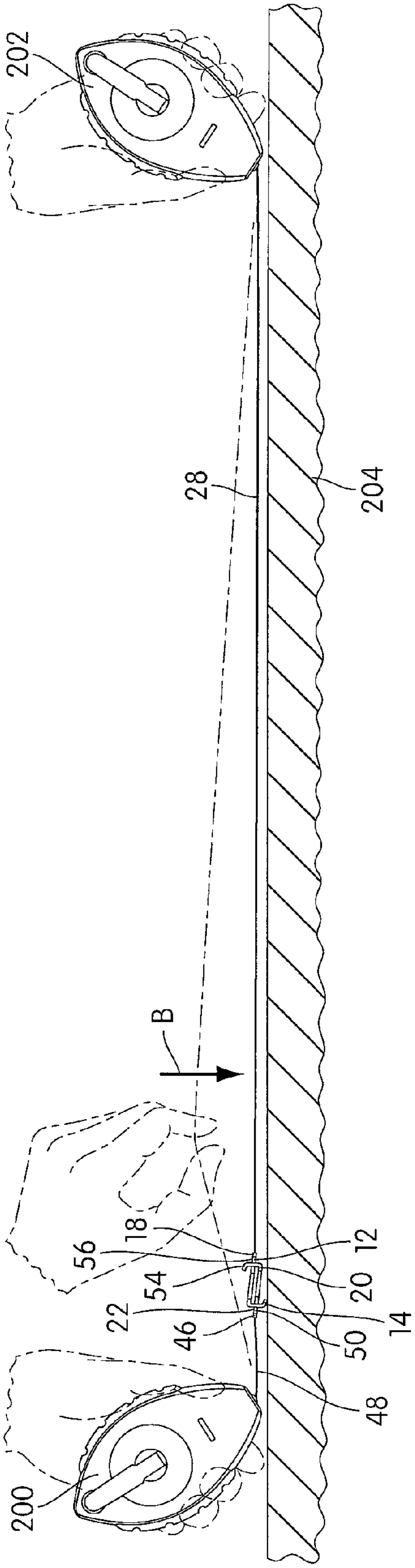
FIG. 9 is a perspective view of the chalk line released after being stretched from a chalk line device, which is connected to the identical chalk line device using two identical chalk line hooks in accordance with an embodiment of the present invention.

In one embodiment, after the chalk line hooks 10 and 20 are locked together, the chalk line is pulled from the chalk line devices 200 and 202 to obtain chalk line of desired length (up to twice the length of one of lines as shown in FIG. 7). As shown in FIG. 8, in one method, the connected hooks are disposed adjacent to (or even contacting) one of the chalk line devices 200, within which the line 48 is substantially contained, and the line 28 of the other device 202 is substantially extended. In this method, the chalk lines 28 and 48 are snapped by pulling the chalk line 28 upwardly in the direction of the arrow A. With the lines 28, 48 tensioned, they are then released in the direction of the arrow B as shown in FIG. 9. This snapping action will deposit or discharge chalk on the lines 28, 48 onto the surface therebeneath.

When used separately, the anchor portion 14 of the chalk line hook 10 can be used to anchor the chalk line to a work surface or work piece 204. When the chalk lines 28 and 48 are connected together, once desired length of the chalk line is obtained, the chalk line 28, the chalk line 48 or both are snapped for depositing chalk markings on surfaces. However, in accordance with one methodology presented herein, only one chalk line may be extended while the other remains retracted in the device housing. For example, the chalk line 28 may be fully extended from the chalk line device 202, and may be snapped once or several times such that the chalk powder thereon is substantially dissipated therefrom. The chalk line 28 may then be retracted into the chalk line device 202 by user 250 for rechalking. With the chalk line 28 being connected to chalk line 48, retracting the line 28 will extend (pull) the line 48 out of its housing 200. The chalk line 48 is then ready for use with powder thereon. In a different embodiment, the line 48 may be paid out of its housing 200 while line 28 is retracted. However, this should not be necessary, as pulling on the line 48 by virtue of pulling action of the line 28 should be sufficient.

Similarly, when the chalk line 48 has been snapped once or several times such that the chalk powder thereon is depleted, the user 252 may reel the length of the chalk line 48 into the chalk line device 200, which pulls the line 28 out from device 202. The line 28 will emerge out of the chalk line device 202 with a fresh deposit of chalk thereon.

In the previously discussed embodiments, the chalk line hook 10 and the identical chalk line hook 20 are connected and locked to each other by engaging the captured portion 22 of the identical chalk line hook 20 with the anchor portion 14 and the lock portion 16 of the chalk line hook 10, and engaging the captured portion 56 of the chalk line hook 10 with the anchor portion 60 and a lock portion 80 (as shown in FIG. 6) of the chalk line hook 10. It should be appreciated, however, that in other embodiments the chalk line hook may include a single prong that is constructed and arranged to engage with the opening located in the base portion of a different identical chalk line hook to connect the two identical chalk line hooks. Optionally, the prong and/or the opening may include a lock portions to lock the two identical chalk line hooks.

Figure 10:
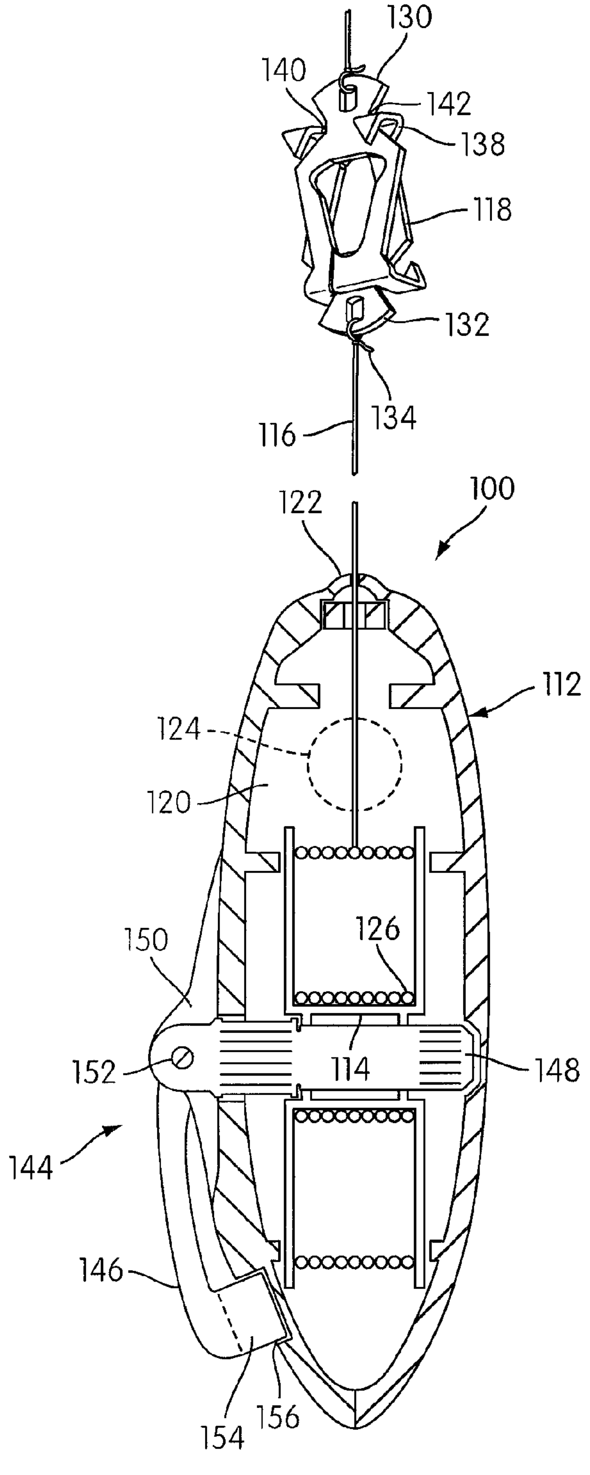
FIG. 10 is a cross-sectional view of the chalk line device in accordance with an embodiment of the present invention.

FIG. 10 shows a chalk line device 100 includes a housing 112, a chalk line support 114, a chalk line 116, and a chalk line hook 118. The housing 112 includes a reservoir 120 to store the chalk. In one embodiment, the housing 112 includes a chalk line port 122 and a chalk port 124. The chalk reservoir 120 is in communication with the chalk port 124. The chalk line 116 is spooled around a chalk line support or reel 114. The chalk line support 114 is rotatably mounted in the interior space in the housing 112. The chalk line 116 has one end 126 secured to the chalk line support 114 within the housing 112 and another or free end 134 provided with the chalk line hook 118 disposed outside of the housing 112. The chalk line 116 extends through the chalk line port 122. As described in previous embodiments, the chalk line hook 118 is constructed and arranged to connect with an identical chalk line hook 130 to provide a chalk line having a length of two chalk lines. The chalk line hook 118 includes a connector portion 132 constructed and arranged to connect with a free end 134 of the chalk line 116, an anchor portion 138 operatively joined with the connector portion 132 for anchoring the hook 118, and a lock portion 140 constructed and arranged to lockingly engage with a captured portion 142 of the identical chalk line hook 130.

The chalk line device 100 further includes a retracting mechanism 144 which is mounted to the housing 112. The retracting mechanism 144 comprises a handle 146, a crank shaft 148 and an integral hub 150. The retracting mechanism 144 is connected to the chalk line support 114 via the crank shaft 148 and allows the chalk line 116 to be freely extended from the housing 112 through the chalk line port 122 when the user pulls the hook 118 attached to end 134 of chalk line 116. The retracting mechanism 144 also allows selective retraction of the chalk line 116 into the housing when the user rewinds the chalk line by rotating the handle 146. Of course any known retracting and spooling mechanisms could be used.

The handle 146 is connected to hub 150 via pivot pin 152. The handle 146 can easily be moved from a storing position through an arc of about 180 degrees to assume a cranking position as is known. The handle 146 has an end knob 154 rotatably mounted on handle 146 to allow the user to rotate the handle 146 while being able to maintain grip on the knob 154. This feature facilitates rewinding of the chalk line. In addition, the knob 154 also serves as a rotating-stop for halting the rotation of the hub 150 and crank shaft 148 when the handle 146 is moved to a stored position. In the stored position, the knob 154 is inserted into a groove 156 provided in the exterior surface of housing 112. In this way, the groove 156 serves as a rotating-stop and also renders the arm 146 more compact with the housing 112 for storage and/or handling.

In one embodiment, a movable door is secured to the housing 112 over the chalk port 124 to selectively open and close the chalk port 124. Any suitable closure mechanism may be used including a hinged door, a sliding door or even a self-sealing access port.

Although the chalk line hook 10 is shown in the illustrated embodiments having a certain shape or form, it is also within the scope of the present invention to have various shapes or form as long as the chalk line hook is constructed and arranged to connect with an identical chalk line hook to provide a chalk line having a length of two chalk lines. The chalk line hook can be made from any material, such as but not limited to metal and plastic.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A chalk line hook constructed and arranged to connect with an identical chalk line hook to provide a chalk line having a length of two chalk lines, comprising:

a connector portion constructed and arranged to connect with a free end of the chalk line;

an anchor portion operatively joined with the connector portion for anchoring the hook; and a lock portion constructed and arranged to lockingly engage with a captured portion of the identical chalk line hook;

wherein the anchor portion comprises a pair of spaced apart prongs, wherein the lock portion comprises a pair of bumps that receive the captured portion therebetween, wherein the prongs are flexible to enable separation therebetween to enable the captured portion of the identical chalk line hook to ride over the bumps, and then enable the bumps to return to their original positions to secure the captured portion therebehind.

2. A chalk line device, the device comprising:

a housing, the housing comprises a reservoir for storing chalk;

a chalk line support within the housing;

a chalk line, the chalk line constructed and arranged to be secured to the chalk line support at one end thereof; and a chalk line hook, the hook connected to the chalk line at a free end of the line that is opposite to the one end;

wherein the chalk line hook is constructed and arranged to connect with an identical chalk line hook to provide a chalk line formed from two separate chalk lines so as to form a combined chalk line having a length of two chalk lines, the hook comprising: a connector portion constructed and arranged to connect with the free end of the chalk line; an anchor portion operatively joined with the connector portion for anchoring the hook; and a lock portion constructed and arranged to lockingly engage with a captured portion of the identical chalk line hook.

3. The device of claim 2, wherein the connector portion comprises an opening therethrough to connect with the free end of the chalk line.

4. The device of claim 2, wherein the anchor portion comprises a pair of prongs that are spaced apart from each other.

5. The device of claim 4, further comprising a base portion, wherein the pair of prongs are integrally formed with the base portion.

6. The device of claim 5, wherein each prong comprises a first portion and a second portion that extends from the first portion, wherein the second portion extends generally within the same plane as the base portion, and the second portion is perpendicular to the first portion.

7. The device of the claim 6, wherein the lock portion comprises a pair of bumps that receive the captured portion therebetween.

8. The device of the claim 7, wherein the bumps are each provided on a respective one of the prongs.

9. A chalk line device, the device comprising:

a housing, the housing comprises a reservoir for storing chalk;

a chalk line support within the housing;

a chalk line, the line constructed and arranged to be secured to the chalk line support at one end; and a chalk line hook, the hook connected to the chalk line at a free end of the line that;

wherein the chalk line hook is constructed and arranged to connect with an identical chalk line hook to provide chalk line having a length of two chalk lines, the hook comprising: a connector portion constructed and arranged to connect with the free end of the chalk line; an anchor portion operatively joined with the connector portion for anchoring the hook; and a lock portion constructed and arranged to lockingly engage with a captured portion of the identical chalk line hook, wherein the anchor portion comprises a pair of spaced apart prongs, wherein the lock portion comprises a pair of bumps that receive the captured portion therebetween, wherein the prongs are flexible to enable separation therebetween to enable the captured portion of the identical chalk line hook to ride over the bumps, and then enable the bumps to return to their original positions to secure the captured portion therebehind.

10. A method of generating chalk lines, comprising:

connecting hooks at their respective ends of two previously unconnected lines with one another;

extending a first of the two lines at least partially outwardly from a first housing, the first line having chalk powder thereon, a second of the two lines substantially disposed within a second housing, the second housing being separate from the first housing;

snapping the first line at least once to discharge chalk on the first line onto a surface;

retracting the first line into the first housing while extending the second line, connected with the first line, outwardly from the second housing; and snapping the second line at least once after it has been extended outwardly from the second housing.

11. The method of claim 10, wherein the extending of the second line is achieved by the force applied to the second line by the retracting of the first line.

* * * * *

UNITED STATES PATENT AND TRADEMARK OFFICE
Certificate

Patent No. 7,913,408 B2 Patented: March 29, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Matthew Grisham, Hartford, CT (US); and James Spaulding, Bristol, CT (US).

Signed and Sealed this Twenty-third Day of August 2011.

LISA CAPUTO
*Supervisory Patent Examiner*
Art Unit 1773/Acting SPE AU 2841
Technology Center 2800

UNITED STATES PATENT AND TRADEMARK OFFICE
Certificate

Patent No. 7,913,408 B2 Patented: March 29, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Matthew Grisham, Hartford, CT (US); and James Spaulding, Bristol, CT (US).

Signed and Sealed this Twentieth Day of September 2011.

LISA CAPUTO
*Supervisory Patent Examiner*
Art Unit 2855/Acting SPE AU 2841
Technology Center 2800